US010880524B2

(12) United States Patent
Winter et al.

(10) Patent No.: US 10,880,524 B2
(45) Date of Patent: Dec. 29, 2020

(54) SYSTEM AND METHOD FOR ACTIVITY MONITORING USING VIDEO DATA

(71) Applicant: Placemeter Inc., New York, NY (US)

(72) Inventors: Alexandre Winter, New York, NY (US); Niklaus Haldimann, New York, NY (US); Tuan Hue Thi, New York, NY (US)

(73) Assignee: Placemeter Inc., New York, NY (US)

( * ) Notice: Subject to any disclaimer, the term of this patent is extended or adjusted under 35 U.S.C. 154(b) by 0 days.

(21) Appl. No.: 16/523,281

(22) Filed: Jul. 26, 2019

(65) Prior Publication Data
US 2019/0373221 A1 Dec. 5, 2019

Related U.S. Application Data

(63) Continuation of application No. 14/727,321, filed on Jun. 1, 2015, now Pat. No. 10,432,896.
(Continued)

(51) Int. Cl.
*H04N 7/18* (2006.01)
*G06K 9/00* (2006.01)
(Continued)

(52) U.S. Cl.
CPC ......... *H04N 7/181* (2013.01); *G06K 9/00369* (2013.01); *G06K 9/00771* (2013.01);
(Continued)

(58) Field of Classification Search
CPC ............. G06K 9/6202; G06K 9/00382; G06K 9/00033; G06Q 10/101; G06F 17/246
See application file for complete search history.

(56) References Cited

U.S. PATENT DOCUMENTS 5,194,908 A 3/1993 Lougheed
6,295,321 B1 9/2001 Lyu
(Continued)

FOREIGN PATENT DOCUMENTS

CN 101489121 A 7/2009
WO 2015/184440 A2 12/2015

OTHER PUBLICATIONS

Machado, D., "People Counting System Using Existing Surveillance Video Camera" Nov. 2011, pp. 1-71.
(Continued)

*Primary Examiner* — Mia M Thomas
(74) *Attorney, Agent, or Firm* — Boyle Fredrickson, SC

(57) ABSTRACT

Embodiments of a method and system described herein enable capture of video data streams from multiple, different devices and the processing of the video data streams. The video data streams are merged such that various data protocols can all be processed with the same worker processors on different types of operating systems, which are typically distributed. An embodiment uses a mobile device (such as a mobile phone) as a device and deploys a video sensor application on the mobile device for encoding consecutive video files, time stamping the consecutive video files, and pushing the consecutive video files to a file server to produce a stable stream of video data. Thus avoiding the inefficiencies associated with having video processing in the data flow loop.

9 Claims, 8 Drawing Sheets

Related U.S. Application Data

(60) Provisional application No. 62/005,815, filed on May 30, 2014.

(51) Int. Cl.
*G06K 9/32* (2006.01)
*G06T 7/20* (2017.01)

(52) U.S. Cl.
CPC .............. *G06K 9/3241* (2013.01); *G06T 7/20* (2013.01); *G06K 2009/3291* (2013.01); *G06T 2207/10016* (2013.01); *G06T 2207/30232* (2013.01)

(56) References Cited

U.S. PATENT DOCUMENTS

| | | |
|---|---|---|
| 6,587,574 B1 | 7/2003 | Jeannin |
| 6,987,883 B2 | 1/2006 | Lipton et al. |
| 6,999,600 B2 | 2/2006 | Venetianer et al. |
| 7,006,128 B2 | 2/2006 | Xie |
| 7,199,798 B1 | 4/2007 | Echigo |
| 7,221,367 B2 | 5/2007 | Cardno |
| 7,224,852 B2 | 5/2007 | Lipton et al. |
| 7,382,244 B1 | 6/2008 | Donovan |
| 7,391,907 B1 | 6/2008 | Venetianer et al. |
| 7,424,175 B2 | 9/2008 | Lipton et al. |
| 7,574,043 B2 | 8/2009 | Porkili |
| 7,613,322 B2 | 11/2009 | Yin et al. |
| 7,688,349 B2 | 3/2010 | Flickner et al. |
| 7,796,780 B2 | 9/2010 | Lipton et al. |
| 7,801,330 B2 | 9/2010 | Zhang et al. |
| 7,868,912 B2 | 1/2011 | Venetianer et al. |
| 7,932,923 B2 | 4/2011 | Lipton et al. |
| 8,325,036 B1 | 12/2012 | Fuhr |
| 8,331,619 B2 | 12/2012 | Ikenoue |
| 8,340,349 B2 | 12/2012 | Salgian |
| 8,340,654 B2 | 12/2012 | Bratton et al. |
| 8,369,399 B2 | 2/2013 | Egnal et al. |
| 8,401,229 B2 | 3/2013 | Hassan-Shafique et al. |
| 8,457,401 B2 | 6/2013 | Lipton et al. |
| 8,526,678 B2 | 9/2013 | Liu et al. |
| 8,564,661 B2 | 10/2013 | Lipton et al. |
| 8,582,803 B2 | 11/2013 | Ding |
| 8,594,482 B2 | 11/2013 | Fan |
| 8,599,266 B2 | 12/2013 | Trivedi |
| 8,625,905 B2 | 1/2014 | Schmidt |
| 8,649,594 B1 | 2/2014 | Hua |
| 8,654,197 B2 | 2/2014 | Nizko |
| 8,655,016 B2 | 2/2014 | Brown |
| 8,711,217 B2 | 4/2014 | Venetianer et al. |
| 8,823,804 B2 | 9/2014 | Haering et al. |
| 8,948,458 B2 | 2/2015 | Hassan-Shafique et al. |
| 9,213,781 B1 | 12/2015 | Winter |
| 9,911,065 B2 * | 3/2018 | Winter ............... G06K 9/00758 |
| 10,043,078 B2 * | 8/2018 | Winter ............... G06K 9/00744 |
| 10,055,914 B2 * | 8/2018 | Huff ........................ G07C 9/25 |
| 10,380,431 B2 * | 8/2019 | Winter ................... G06K 9/627 |
| 2002/0051057 A1 | 5/2002 | Yata |
| 2002/0124263 A1 | 9/2002 | Yokomizo |
| 2003/0053692 A1 | 3/2003 | Hong |
| 2003/0090751 A1 | 5/2003 | Itokawa |
| 2003/0215110 A1 | 11/2003 | Rhoads |
| 2004/0022227 A1 | 2/2004 | Lynch |
| 2004/0151342 A1 | 8/2004 | Venetianer |
| 2004/0161133 A1 | 8/2004 | Elazar |
| 2005/0169531 A1 | 8/2005 | Fan |
| 2005/0185058 A1 | 8/2005 | Sablak |
| 2005/0213836 A1 | 9/2005 | Hamilton |
| 2006/0007308 A1 | 1/2006 | Ide |
| 2006/0031291 A1 | 2/2006 | Beckemeyer |
| 2006/0078047 A1 | 4/2006 | Shu |
| 2006/0095539 A1 | 5/2006 | Renkis |
| 2006/0198608 A1 | 9/2006 | Girardi |
| 2006/0227862 A1 | 10/2006 | Campbell |
| 2006/0233535 A1 | 10/2006 | Honda |
| 2006/0290779 A1 | 12/2006 | Reverte |
| 2007/0024705 A1 | 2/2007 | Richter |
| 2007/0024706 A1 | 2/2007 | Brannon |
| 2007/0071403 A1 | 3/2007 | Urita |
| 2007/0016345 A1 | 5/2007 | Peterson |
| 2007/0127508 A1 | 6/2007 | Bahr |
| 2007/0127774 A1 | 6/2007 | Zhang |
| 2007/0147690 A1 | 6/2007 | Ishiwata |
| 2007/0177792 A1 | 8/2007 | Ma |
| 2007/0273765 A1* | 11/2007 | Wang ........................ G06K 9/38 348/152 |
| 2008/0019566 A1* | 1/2008 | Niem ................. G06K 9/00771 382/103 |
| 2008/0030429 A1 | 2/2008 | Hailpern |
| 2008/0123955 A1 | 5/2008 | Yeh |
| 2008/0137950 A1 | 6/2008 | Park |
| 2008/0152122 A1 | 6/2008 | Idan |
| 2008/0263012 A1 | 10/2008 | Jones |
| 2008/0281518 A1 | 11/2008 | Dozier |
| 2008/0316327 A1 | 12/2008 | Steinberg |
| 2008/0316328 A1 | 12/2008 | Steinberg |
| 2009/0033745 A1 | 2/2009 | Yeredor |
| 2009/0034846 A1 | 2/2009 | Senior |
| 2009/0063205 A1 | 3/2009 | Shibasaki |
| 2009/0080864 A1 | 3/2009 | Rajakarunanayake |
| 2009/0103812 A1 | 4/2009 | Diggins |
| 2009/0141939 A1 | 6/2009 | Chambers |
| 2009/0147991 A1 | 6/2009 | Chau |
| 2009/0222388 A1 | 9/2009 | Hua |
| 2009/0268968 A1 | 10/2009 | Milov |
| 2009/0290023 A1 | 11/2009 | Lefort |
| 2010/0014717 A1 | 1/2010 | Rosenkrantz |
| 2010/0142927 A1 | 6/2010 | Lim |
| 2010/0177194 A1 | 7/2010 | Huang |
| 2010/0211304 A1 | 8/2010 | Hwang |
| 2010/0260385 A1 | 10/2010 | Chau |
| 2010/0290710 A1 | 11/2010 | Gagvani |
| 2010/0295999 A1 | 11/2010 | Li |
| 2010/0302346 A1 | 12/2010 | Huang |
| 2011/0007944 A1 | 1/2011 | Atrazhev |
| 2011/0018998 A1 | 1/2011 | Guzik |
| 2011/0125593 A1 | 5/2011 | Wright |
| 2011/0130905 A1 | 6/2011 | Mayer |
| 2011/0141227 A1 | 6/2011 | Bigiol |
| 2011/0152645 A1 | 6/2011 | Hoover |
| 2011/0153645 A1 | 6/2011 | Hoover |
| 2011/0184307 A1 | 7/2011 | Hulin |
| 2011/0280547 A1 | 11/2011 | Fan |
| 2011/0310970 A1 | 12/2011 | Lee |
| 2012/0008819 A1 | 1/2012 | Ding |
| 2012/0057640 A1 | 3/2012 | Shi |
| 2012/0075450 A1 | 3/2012 | Ding |
| 2012/0086568 A1 | 4/2012 | Scott |
| 2012/0106782 A1 | 5/2012 | Nathan |
| 2012/0127262 A1 | 5/2012 | Wu |
| 2012/0134535 A1 | 5/2012 | Pai |
| 2012/0179832 A1 | 7/2012 | Dolph |
| 2012/0182392 A1 | 7/2012 | Kearns |
| 2012/0262583 A1 | 10/2012 | Bernal |
| 2012/0304805 A1 | 11/2012 | Kim |
| 2013/0058537 A1 | 3/2013 | Chertok |
| 2013/0086389 A1 | 4/2013 | Suwald |
| 2013/0148848 A1 | 6/2013 | Lee |
| 2013/0166711 A1 | 6/2013 | Wang |
| 2013/0170557 A1* | 7/2013 | Wang ........................ G06T 7/11 375/240.24 |
| 2013/0202165 A1 | 8/2013 | Wehnes |
| 2013/0251216 A1 | 9/2013 | Smowton |
| 2014/0003708 A1 | 1/2014 | Datta |
| 2014/0015846 A1 | 1/2014 | Campbell |
| 2014/0036090 A1 | 2/2014 | Black |
| 2014/0046588 A1 | 2/2014 | Maezawa |
| 2014/0129596 A1 | 5/2014 | Howe |
| 2014/0132728 A1 | 5/2014 | Verano |
| 2014/0212002 A1 | 7/2014 | Curcio |
| 2014/0278068 A1 | 9/2014 | Stompolos |
| 2014/0294078 A1 | 10/2014 | Seregin |
| 2014/0307056 A1 | 10/2014 | Collet |
| 2014/0359576 A1 | 12/2014 | Rath |

(56) References Cited

U.S. PATENT DOCUMENTS

| | | | |
|---|---|---|---|
| 2015/0006263 | A1 | 1/2015 | Heier |
| 2015/0046127 | A1 | 2/2015 | Chen |
| 2015/0070506 | A1 | 3/2015 | Chattapadhyay |
| 2015/0077218 | A1 | 3/2015 | Chakkaew |
| 2015/0117761 | A1* | 4/2015 | Huang .................... G06K 9/66 382/159 |
| 2015/0138332 | A1 | 5/2015 | Cheng |
| 2015/0227774 | A1 | 8/2015 | Balch |
| 2015/0339532 | A1 | 11/2015 | Sharma |
| 2015/0348398 | A1 | 12/2015 | Williamson |
| 2015/0350608 | A1 | 12/2015 | Winter |
| 2016/0012465 | A1 | 1/2016 | Sharp |
| 2016/0019427 | A1 | 1/2016 | Martin |
| 2016/0088222 | A1 | 3/2016 | Jenny |
| 2016/0314353 | A1* | 10/2016 | Winter .................... G06T 7/194 |
| 2016/0334927 | A1 | 11/2016 | Kim |
| 2017/0068858 | A1* | 3/2017 | Winter .................. H04N 7/188 |
| 2017/0070707 | A1* | 3/2017 | Winter .................... G06T 7/246 |
| 2017/0243415 | A1* | 8/2017 | Huff ........................ G07C 9/25 |
| 2017/0277956 | A1* | 9/2017 | Winter ................. G06K 9/6248 |
| 2017/0277959 | A1* | 9/2017 | Winter .................. G06K 9/627 |
| 2017/0283086 | A1* | 10/2017 | Garing ............... B64D 45/0005 |
| 2018/0046315 | A1 | 2/2018 | Kim |
| 2018/0165813 | A1 | 6/2018 | Mai |

OTHER PUBLICATIONS

Lefloch, D., "Real-Time People Counting System Using Video Camera" Master of Computer Science, Image and Artificial Intelligence 2007 at UFR Sciences et Technique, pp. 1-5.

Terada, K., "A Method of Counting the Passing People by Using the Stereo Images" Image Processing, 1999, ICIP 99. Proceedings. 1999 International Confenerence, pp. 1-5.

Bannour, H.,, et al., "Survey of the Adequate Descriptor for Content-Based Image Retrieval on the Web" Global versus Local Features, Department of Information Sciences.

Lisin, D. et al., "Combining Local and Global Image Features for Object Class Recognition" Computer Vision Lab, Department of Computer Science, University of Massachusetts.

Paninski, L., "Estimation of Entropy and Mutual Information" Center for Neural Science, New York University, New York, NY 10003, USA, Accepted Nov. 27, 2002.

Makris et al., "Learning Semantic Scene Models From Observing Activity in Visual Surveillance" Jun. 2005, IEEE, Trans. on Systems, Man, and Cybernetics—part B: Cybernetics, vol. 35, No. 3, p. 397-408.

Estevez-Ayres et al., "Using Android Smartphones in a Service-Oriented Video Surveillance System", Jan. 2011, IEEE Int. Conf. on Consumer Electronics, 2011, p. 887-888.

Parameswaran et al., "Design and Validation of a System for People Queue Statistics Estimation", Jan. 2012, Springer, Video Analytics for Business Intelligence, ;. 355-373.

Foresti et al., "Event Classification for Automatic Visual-Based Surveillance of Parking Lots", Aug. 2004, IEEE, Proceedings of the 17th Int. Conf. on Pattern Recognition, p. 1-4.

Yang et al., "Multi-Target Tracking by Online Learning of Non-Linear Motion Patterns and Robust Appearance Models", Jun. 2012, IEEE, 2012 IEEE Conf. on Computer Vision and Pattern Recognition, p. 1918-1925.

Magee, "Tracking Multiple Vehicle Using Foreground, Background and Motion Models", Feb. 2004, Elsevier, Image and Vision Computing, vol. 22, issue 2, p. 143-155.

Morris et al., "A Survey of Vision-Based Trajectory Learning and Analysis for Surveillance", Aug. 2008, IEEE, IEEE Transactions on Circuits and Systems for Video Technology, vol. 18, No. 8, p. 1114-1127.

Stauffer et al., "Adaptive Background Mixture Models for Real-Time Tracking", Jun. 1999, IEEE, 1999 IEEE Computer Society Conference on Computer Vision and Pattern Recognition Proceedings, p. 246-252.

Xu et al., "Partial Observation vs. Blind Tracking through Occlusion", Jan. 2003, British Machine Vision Conference (BMVC 2002), p. 777-786.

Virtual Turnstile | Security Systems Technology | www.sstgroup.co.uk/solutions/access-control/virtual-turnstile pp. 1-2.

Amended Claims of Related U.S. Appl. No. 15/288,085, submitted Jun. 13, 2018.

Amended Claims of Related U.S. Appl. No. 15/288,224, submitted May 9, 2018.

Placemeter Inc., PCT/US2015/033499 Application, "Notification of Transmittal of the International Search Report and the Written Opinion", dated Oct. 28, 2015.

Placemeter Inc., PCT/US2016/025816 Application, "Notification Concerning Transmittal of International Preliminary Report on Patentability", dated Nov. 2, 2017.

Placemeter Inc., PCT/US2016/025816 Application, "Notification of Transmittal of the International Search Report and the Written Opinion", dated Jul. 11, 201.

Placemeter Inc., PCT/US2016/028511 Application, "Notification Concerning Transmittal of International Preliminary Report on Patentability", dated Nov. 2, 2017.

Placemeter Inc., PCT/US2016/028511 Application, "Notification of Transmittal of the International Search Report and the Written Opinion", dated Sep. 14, 2016.

Placemeter Inc., EP 15798996.3 Application, "Communication Pursuant to Rule 164(1) EPC—Partial Supplementary European Search Report", dated Nov. 27, 2017.

Placemeter Inc., EP 15798996.3 Application, "Communication—Extended European Search Report", dated Feb. 6, 2018.

Baudrier E., et al., "A Fast Binary-Image Comparison Method with Local-Dissimilarity Quantification", Laboratory Crestic, Troyes Cedex, France.

Almomani, R., et al., "Segtrack: A Novel Tracking System with Improved Object Segmentation", IEEE 2013, Wayne State University, Department of Computer Science, Detroit, MI 48202, ICIP 2013, p. 3939-3943.

Lucas, B., et al., "An Iterative Image Registration Technique with an Application to Stereo Vision", Proceedings of Imaging Understanding Workshop 1981, Computer Science Department, Carnegie-Mellon University, p. 121-130.

Russakoff, D., et al., "Image Similarity Using Mutual Information of Regions", Dept. of Computer Science, Stanford University, ECCV 2004, LNCS 3023, Springer-Verlag, Berlin Heidelberg 2004, pp. 596-607.

Shi, J., et al., "Good Features to Track", IEEE Conference on Computer Vision and Pattern Recognition (CVPR94), Seattle, Jun. 1994.

Studholme, C., et al., "An Overlap Invariant Entropy Measure of 3D Medical Image Alignment", 1999 Pattern Recognition Society, Published by Elsevier Sciences Ltd., Pattern Recognition 31 (1999), p. 71-86.

Viola, P., et al., "Robuts Real-Time Face Detection", 2004 International Journal of Computer Vision 57(2), Kluwer Academic Publishers, Netherlands, p. 137-154.

"Virtual Turnstile" Security Systems Technology Ltd 2008 pp. 1-2.

Borges, "Pedestrian Detection Based on Blob Motion Statistics", Feb. 2013, IEEE, IEEE Trans. on Circuits and Systems for Video Technology, vol. 23, No. 2, pp. 224-235 (Year 2013).

Miller, "Supervised Learning and Bayesian Classification", Sep. 2011, University of Massachusetts Amherst, CS370; Introduction of Computer Vision (<https://people.cs.umass.edu/~elm/Teaching/370_S11/>), <https://people.cs.umass.edu/~elm/Teaching/Docs/supervised.pdf>, p. 1-8 (Year 2011).

Franconeri et al., "A simple proximity heuristic allows tracking of multiple objects through occlusion", Jan. 2012, Psychonomic Society, Attention, Perception & Psychophysics, vol. 74, issue 4, pp. 691-702 (Year 2012).

Stephen et al., "A visual tracking system for the measurement of dynamic structural displacements", Aug. 1991, Wiley, Concurrency and Computation: Practice and Experience, vol. 3, issue 4, pp. 357-366 (Year 1991).

\* cited by examiner (1) DETECTION OF ACTIVITY AREAS
FIG. 3
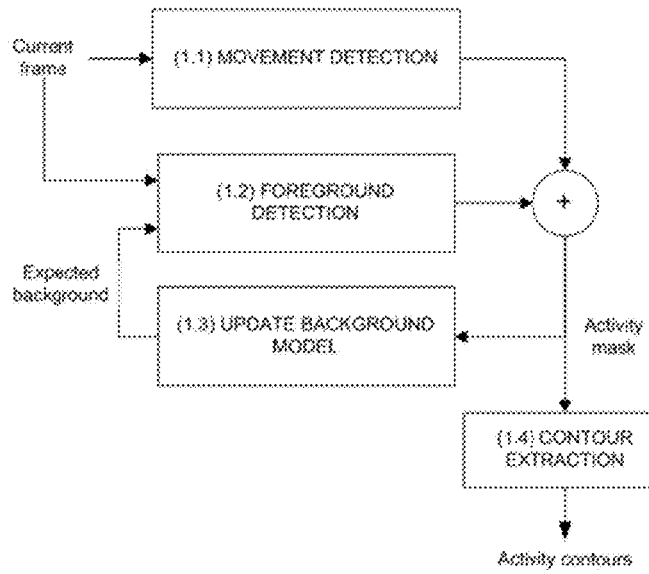
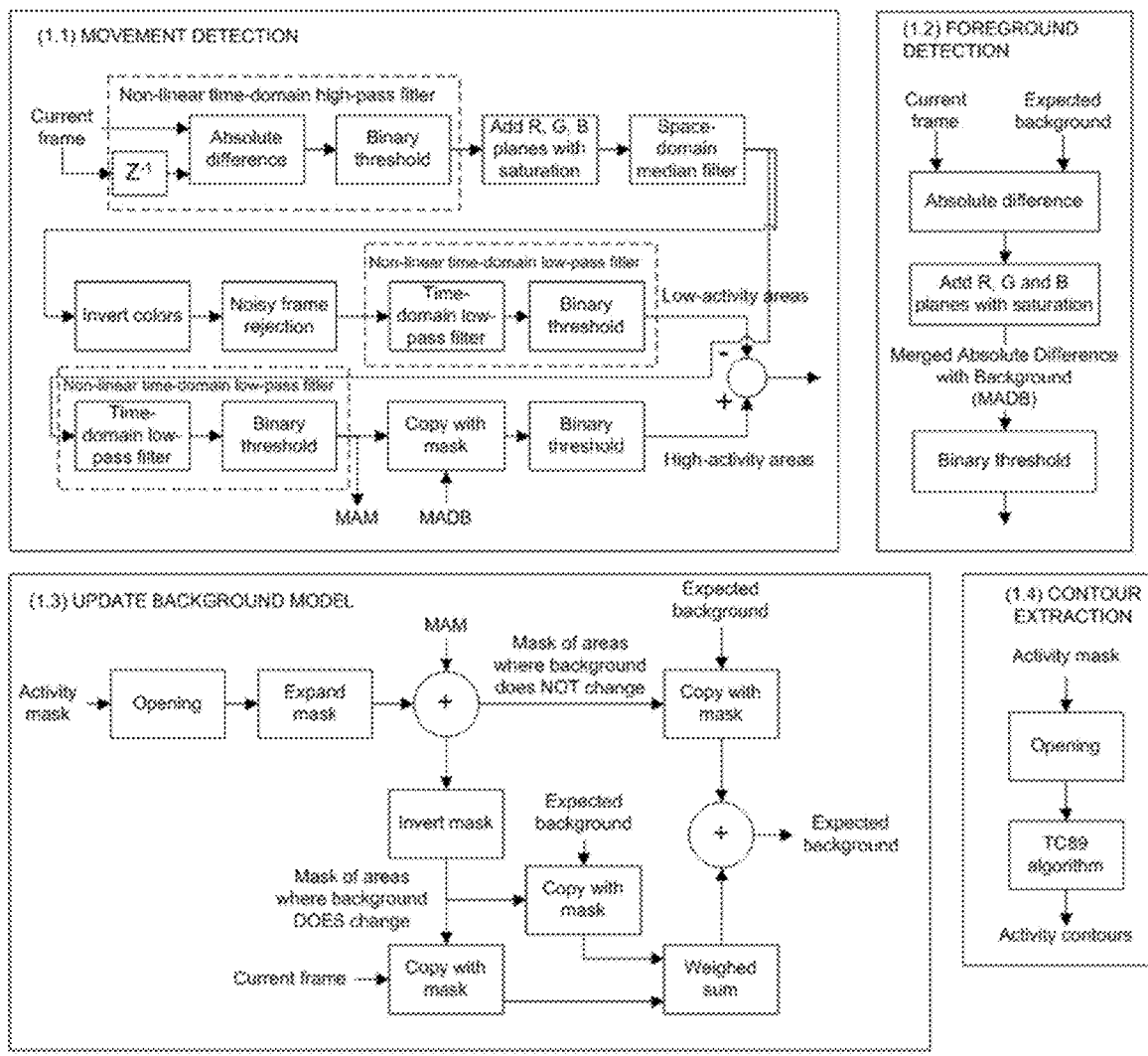

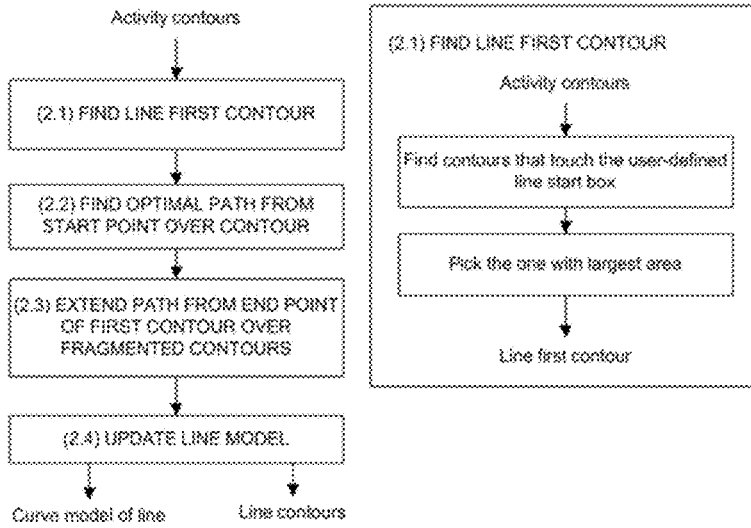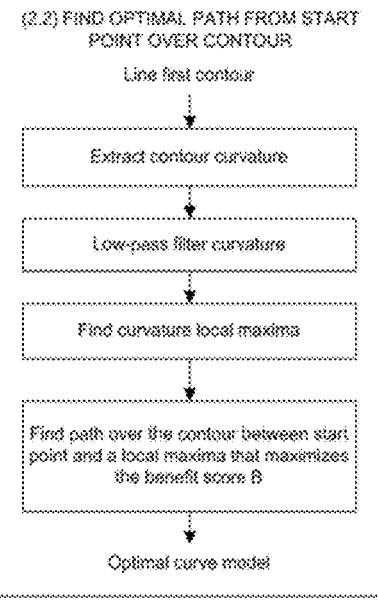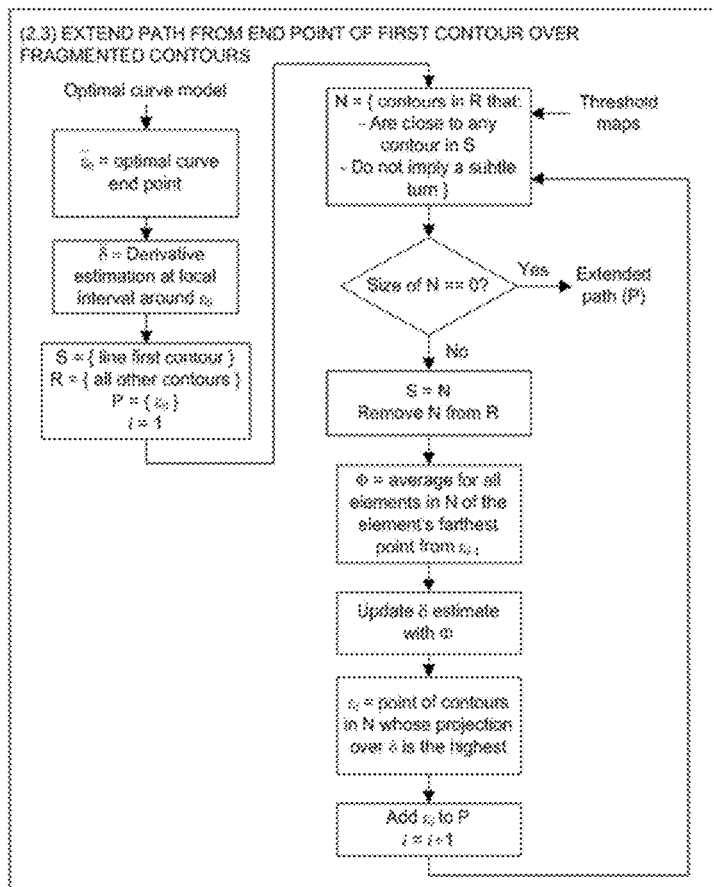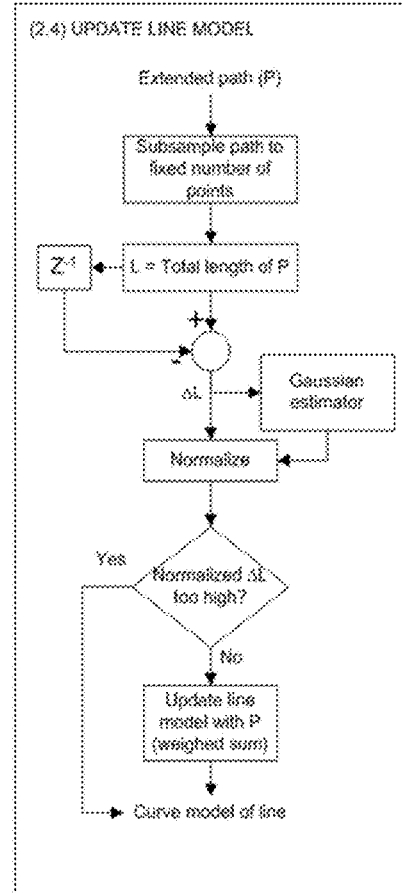
FIG. 4

SYSTEM AND METHOD FOR ACTIVITY MONITORING USING VIDEO DATA

RELATED APPLICATIONS

The present application relates to and claims the benefit of priority from U.S. application Ser. No. 14/727,321, filed Jun. 1, 2015, and U.S. Provisional Application Ser. No. 62/005,815, filed May 30, 2014, both of which are hereby incorporated by reference in their entirety for all purposes as if sully set forth herein.

FIELD OF THE INVENTION

Embodiments disclosed herein are in the field of video data processing, in particular object detection and pattern recognition.

BACKGROUND

Various techniques exist for processing digital video data for purposes of image recognition, pattern recognition, object detection, etc. Typically, video data is captured by one type of device and then analyzed by the device or by another processing device. For example, one method includes acquiring visual image primitives from a video input comprising visual information relevant to a human activity. The primitives are temporally aligned to an optimally hypothesized sequence of primitives transformed from a sequence of transactions as a function of a distance metric between the observed primitive sequence and the transformed primitive sequence. Another method detects a moving target with the use of a reference image and an inspection image from the images captured by one or more cameras. A moving target is detected from the reference image and the inspection image based on the orientation of corresponding portions in the reference image and the inspection image relative to a location of an epipolar direction common to the reference image and the inspection image; and displays any detected moving target on a display.

Current video data processing techniques typically operate on one type of video input data. Making available a larger source of data aggregated from multiple sources into a combined source has not been possible for individual contributors.

In addition, it has proven challenging to process large amounts of streaming video data effectively.

It would be desirable to have a system and method for receiving digital video data from multiple sources of different types and be able to analyze the raw data as a single data source from the different sources to determine facts about a scene both at a point in time and over a period of time.

BRIEF DESCRIPTION OF THE DRAWINGS

FIG. 3 is a flow diagram showing more detail of detection of activity areas from video data according to an embodiment.

FIG. 4 is a flow diagram showing more detail of deriving waiting line segmentation from video data according to an embodiment.

DETAILED DESCRIPTION

Embodiments described herein include a system and method for processing video data from multiple sources in order to determine the status of various aspects of environments. For purposes of illustration and ease of description, the system and methods described will be referred to as the Placemeter system, or Placemeter. Placemeter uses video streams to measure activity levels in the physical world to enable people and businesses to interact more effectively and efficiently with physical locations and cities.

In an embodiment, the Placemeter system uses the input video streams from a variety of sources. Sources include existing video feeds such as security cameras, video feeds contributed by system users through old smartphones placed in a fixed location simple webcams, or embedded sensors that contain a video feed and some video analysis software. The system includes a backend subsystem consisting of specially programmed processors executing software that manages video feeds, processes the video feeds into data, stores the data, and computes analytics and predictions.

Various novel video algorithms are the part of the system that is dedicated to transforming a video signal into data and measurements. Novel data algorithms combine measurements from video feeds with lower resolution activity maps or weather information, and local events, to infer place activity in space and time. An output interface includes tools to turn the data extracted from videos into human readable information and useful actions.

Figure 1:
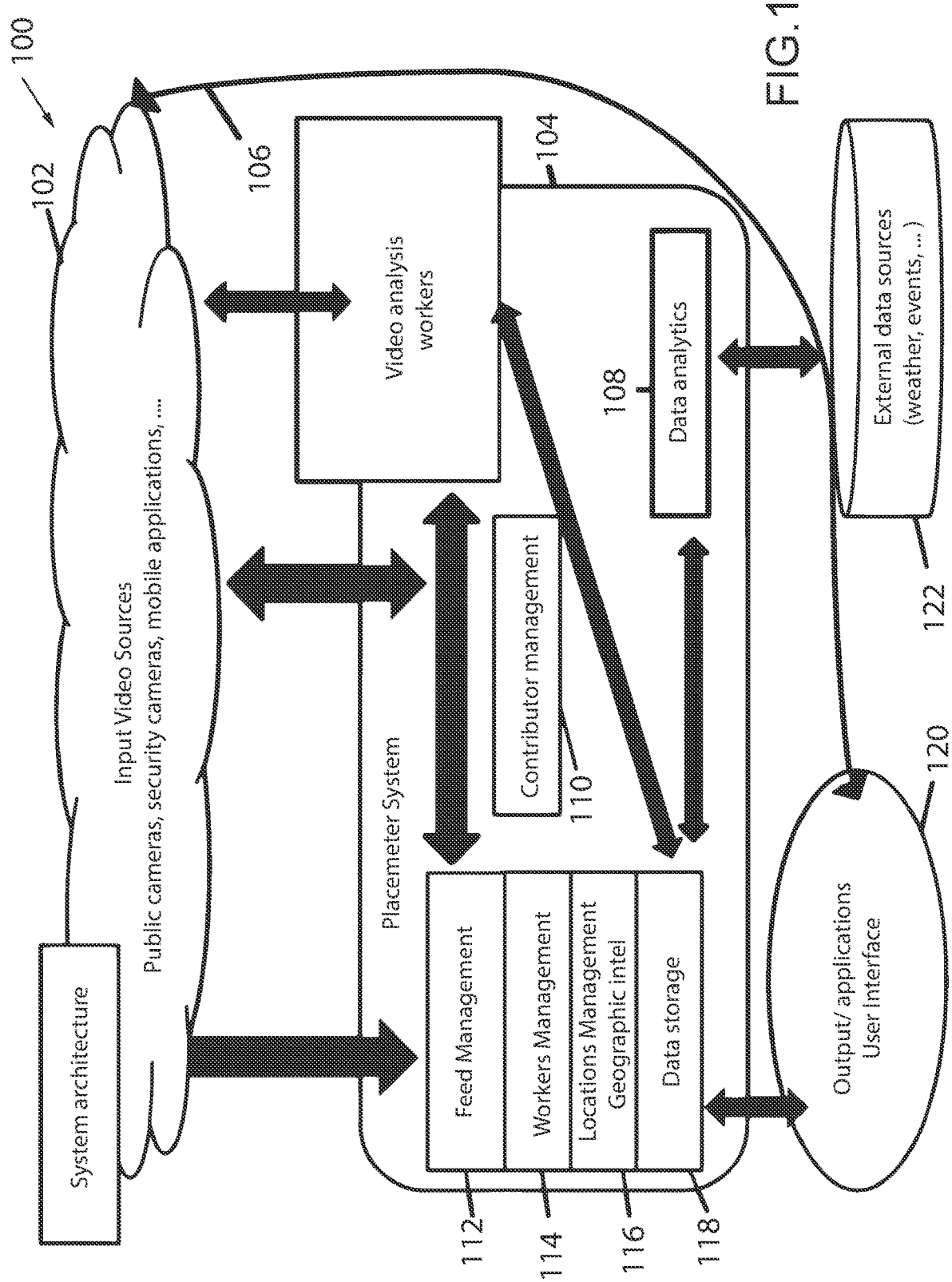
FIG. 1 is a block diagram of an activity monitoring system according to an embodiment.

FIG. 1 is a block diagram of a Placemeter system architecture 100 according to an embodiment. Input video sources 102 can include public cameras, security cameras, mobile application, and any other device capable of capturing digital video streams. This includes a proprietary protocol to do continuous streaming over long periods of time (which is difficult in the prior art). A feedback loop is used to reconstruct and identify (and fix) bandwidth issues.

The input video sources are very varied in nature and quality. Embodiments facilitate the processing and analysis of any possible video source, whatever its type or support. These sources include: existing public video cameras in the form of standard video streams; existing public video feeds in the form of jpg files regularly updated on a website; simple webcams; security cameras installed for security purposes but whose feeds can be ingested by Placemeter to be processed to extract data; video streams or files coming from old cell phones that run a Placemeter video sensing application. The Placemeter sensing application can either produce actual video streams, or encore video files and push them on a hosted storage server such as FTP server or Amazon S3 server. Using a smartphone as a video sensor enables and easy to set up and configure capture device, that easily streams data out through files. This solves a major problem of setting cameras and exporting their feeds to a different network location on the internet.

The system thus provides a unified framework to intake video frames coming from these various described sources, and to unify their geolocation and time reference so as to be able to compare any geolocated or time stamped data extracted from them.

An embodiment uses consecutive video files on the smartphone that are encoded, time stamped, and pushed to an FTP server is an innovative way to produce a stable stream of video content without having to have a video streaming server in the loop, but rather a simple file server. Methods disclosed solve many existing problems related to data streaming using cellphones. Those problems range from fundamental issues like non-existing protocol, hence no known implementation, to legal issues (e.g. GPL softwares are not allowed to be used on distributed app networks like AppStore or Google Apps), and the high expense involved in maintaining brittle and sophisticated streaming servers sitting between the cellphones and the video algorithm processor.

These video feeds are produced by multiple types of entities, including: companies or entities that own video feeds, and provide them for free—e.g. the DOT in New York; companies or entities (e.g. retailers) that own video feeds, and provide them to the system in exchange so for having them transformed into valuable data; companies or organizations that are paid for access to the video feeds they own and operate—e.g. earthcam; companies with whom there is no monetary exchange, e.g. they provide their feed, in exchange for a minimal amount of data for free; and individual contributors who use old smart phones or contribute old cell phones, to hang the phones on window or wall surface, and by running the Placemeter sensing application on these old phones, they can create new Placemeter video feeds. The incentive used to recruit these individuals is either monetary or it is based on the value they get from the data which Placemeter extracts from their own feeds, or from the Placemeter network of feeds.

Compiling all these sources to create data insights and analytics has more scaling network effect than all single data sources combined. This is made possible in part by aggregating data from multiple sources (including individual contributors) into a combined, stable source.

A backend subsystem 104 receives the video data streams from the input video sources 102. Management module 112 is a feed management module that receives the video data streams. Other management modules include a worker management module 114, a locations management and geographic intelligence module 116, and a data storage module 118. Data storage module 118 is shown as a single module existing in the backend subsystem 104. However, actual data storage can be, and typically is, distributed anywhere over the internet. Data storage module 118 is thus a data management module and possibly actual data storage, but not all data will be stored locally.

Input video sources 102 also communicate with a contributor manager 110. Contributor manager 110 oversees and tracks the various input video sources, including their locations and "owners". In some instances, individual owners are paid for making their video data available to the system. Video analysis workers 106 represent multiple special purpose processors tasked with executing video analysis worker processes as further described below. Analyzed video data is stored by data storage manager 118, and also further analyzed by data analytics 108 as further described below. Data analytics 108 represent special purpose processors executing data analytics processes. Data analytics 108 further have access to external data sources 122, which provide data such as weather information, event information related to a location of the video data, etc. Data analytics 108 may combine external data with the output of the video analysis workers 106 to produce more meaningful output data that is stored by data storage manager 118 and output to user interface and applications 120. User interface and applications 120 make processed video data available to users in a highly accessible form. User interface 120 is in various embodiments, available on any computing device with processing capability, communication capability, and display capability, including personal computers and mobile devices.

In an embodiment, the backend system is a multi-layer system whose roles include: registering all existing video streams and their sources; if the source is a contributor, storing availability and contact information to provide data or to pay them, based on the availability of their sensors; managing "worker" processes that will process all video feeds in a different subsystem, and will report data to this system; gathering and storing data extracted from video streams; consolidating and merging all data from various sources (e.g., video measurements, weather APIs); packaging and serving data for application or as an output of the system; and architecturally removing the dependency of the video algorithm processor on the various sources of data.

According to one aspect of the backend, it serves to coordinate how all input sources and worker processes are distributed over different types of networks and environments. An application programming interface (API) is defined for worker processes (worker software processes that can run on any operating system such as Linux, Mac OS or Windows with sufficient RAM and CPU power) to register with the Placemeter backend over a Wide Area Network (WAN), assign individual feed with corresponding algorithm parameters and specifications, and then start processing that feed and reporting output data back to the same API endpoint family. These worker processes also report on their level of activity, CPU and RAM occupancy, as well as availability. With such a system, Placemeter can instantiate worker processes in many varied environments, thus leveraging available platforms that can contribute CPU power.

The system executes various video algorithms and various data algorithms. In an embodiment, the video algorithms are based on a three-layer stack. In an embodiment, these three algorithmic layers are based on the assumption that video feeds have a static viewpoint and an average frame rate greater than 0.2 frames per seconds, but embodiments are not so limited.

Video Algorithms

Moving object detection is a layer is that detects moving objects or moving parts in the image. It is based on estimating the background image of a fixed video stream, by modeling each point using a Gaussian distribution of values on each channel of a color image, or the amplitude of the combined channels. Each pixel is then modeled as: Gaussian distributions for all channels of the color image; a Gaussian distribution for the pixel luminance expressed as a linear combination of the three color channels.

Such a model is created and stored in memory for each coordinate point of an image. As new frames arrive in the system, the Gaussian model estimation is updated with the new values of each pixel at the same coordinate by storing the sum S of the pixel values over time, and the sum T of squared values. Given the total number of observations is N, the average and standard deviation of the Gaussian model can then be evaluated as S/N for the mean value and (2S−S*S)/N for the square value of the standard deviation.

In order to adjust the Gaussian values to potential changes in the mean and standard deviation, these values are computed on moving time windows. In order to reduce the complexity of computing all values over a moving averages, a half distance overlapping scheme is used. If M is the minimum window size (number of samples) over which mean and standard deviation is to be estimated, two sets of overlapping sums and square sums are constantly stored: the current sum set and the future sum set. Each set has the number of samples and the sum of values and the sum of square values. When the first set reaches M samples, the second set is reset, and then updated with each new frame. When the first set reaches M*2 samples, the future set reaches M samples. The future set values are then copied into the current set values, and the future set is reset. This way, at any point in time after M first samples, the estimation of the Gaussian model always has more than M samples, and it is adjusted over time windows of M*2 samples. M is typically set to values ranging from 10 to 1000 depending on applications and video frame rates.

Once a new frame comes in, for each pixel location in an image, it is first assessed whether the current value is part of the background or not. To do so, the normalized distance of the current pixel values is computed for each color channel with the background mean values for each channel. The normalized distance is the distance of the current point to the closest mean adjusted with the standard deviation for the background images. This distance is then normalized towards the amplitude of each channel or the average of all channels. The raw distance calculated from above is divided by a uniform factor of the average values.

If this normalized distance is greater than a predefined threshold, the pixel is classified as a foreground pixel and assigned to the moving objects. If not, the pixel is deemed as part of the background, it is not assigned to the front end masks but used to update the current background models.

At any point in time, the algorithm assumes that there could be a rapid change in background, so it maintains a candidate background point. That point is either updated or created for each point detected as a foreground point.

If the image is too large, the image can be subsampled by an integer factor to evaluate a lower resolution version of the background. Also, the background statistics can be updated only once every n frames. This is very efficient to make the algorithm real time whatever the dimension or frame rate of a video. The CPU occupancy of such a process is controlled and defined with these two parameters. This is a unique way to linearly adjust algorithm reactivity and accuracy based on available or desired computation power.

The object classification layer classifies moving foreground objects (described with reference to the previous layer) into classes of known objects or "noise". In one embodiment, a customized version of the Haar Pyramid approach is used here. Once all moving objects have been detected, they are classified using a classic supervised learning approach, based on the Haar-like feature Cascade classification (as described in P. A. Viola, M. J. Jones: Robust Real-Time Face Detection. ICCV 2001).

According to embodiments, the system is trained and tested, and the algorithms run only on moving objects, thereby reducing the possibilities and variety of the training and input sets of images. In short the classification scheme only needs to recognize moving urban objects from each other, as opposed to recognizing one type of object from any other possible matrix of pixels.

A tracking layer detects the trajectory of one given object over time. The system uses a novel approach based on a holistic model of the trajectories in the image based on existing known foreground objects or newly emerged objects.

An analysis layer uses the type and trajectory information to detect higher level, human readable data such as vehicle or pedestrian speed, and people entering or exiting a location. Inferences can also be drawn based on building layouts, vehicle traffic flows, and pedestrian traffic flows.

Data Algorithms: Line Analysis

Embodiments also include data algorithms that perform specific tasks based on the data obtained from the main stack of video algorithms above. As an example of a data algorithm, line analysis will be described in detail below.

Figure 2:
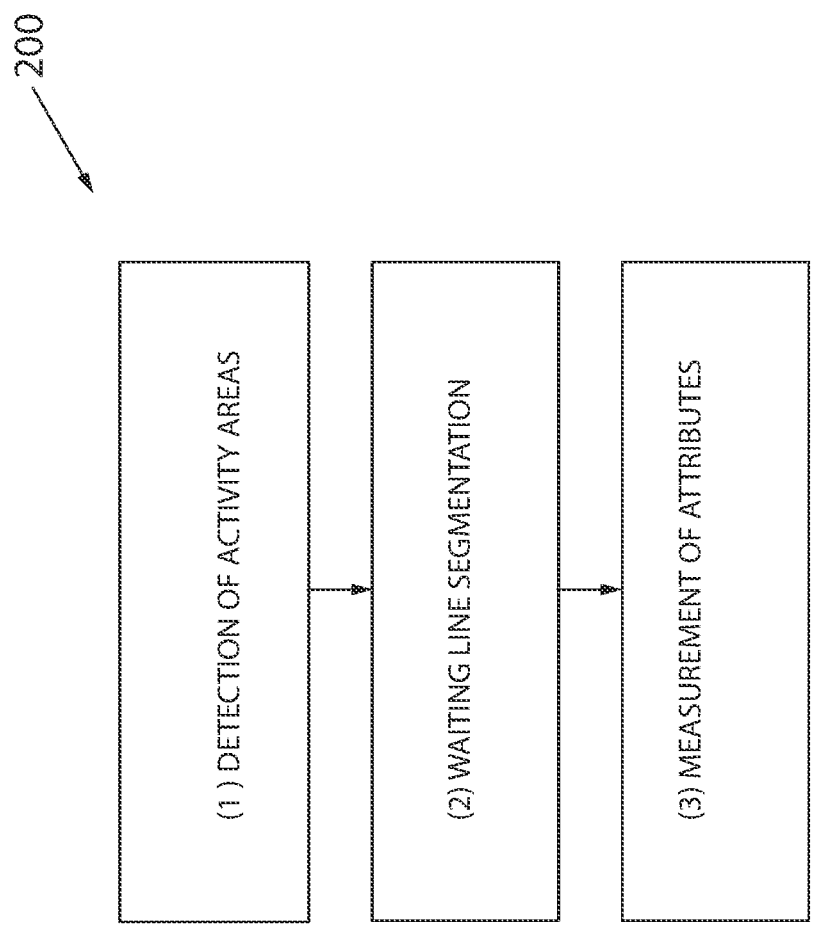
FIG. 2 is a flow diagram illustrating one video processing algorithm according to an embodiment.

Line analysis is a data algorithm that uses a video of a line to detect how many people wait in line and how long it takes them to go through the whole line. Embodiments analyze a waiting line in real time video sequences. The goal of the algorithm is the estimation of line attributes in real time that can be useful for somebody in the process of deciding whether to join the line. For example, estimations for the number of people that currently wait in the line and for the current wait time are extracted. The current wait time is an approximation of the time that a person will have to wait in the line if she joins it in this moment. With reference to FIG. 2, the analysis has three processes that are repeated for every new captured video frame: 1) detection of activity areas; 2) waiting line segmentation; and 3) measurement of attributes.

With reference to FIG. 3, the first step detects those areas in the video sequence that have potential human activity. This step is done using the previously described moving foreground detection. The current frame is the input being run through the process (1.1) movement detection and process (1.2) foreground detection. The output of those processes in one instance are combined creating an activity mask and are run through the (1.1) contour extraction process. The output of this is the activity contours, which essentially model a waiting line from the input video data. The output of process (1.1) and (1.2) in another instance is run through the process (1.3) update background model. The expected background is generated and that is passed back through process (1.2) foreground detection.

Process (1.1) works specifically by starting with the current frame input. The current frame input is run through a non-linear time-domain high-pass filter which contains processes $Z^{\hat{}}(-1)$, absolute difference and binary threshold. After being run through the non-linear time-domain high-pass filter R, G, B planes with saturation are added. The output of this is run through the space-domain median filter. Once filtered the output is run through either of two routes. In one instance the output is run through a non-linear time-domain low-pass filter which does a time-domain low-pass filter and binary threshold. After running through the filter a copy with the mask is made and the binary threshold is found. The output of this is considered a high activity area and is added to the low activity areas produced by the other instance. In the other instance the output from the space-domain filter has the colors inverted and noisy frames rejected before running through the same linear time-domain low-pass filter described above. The output of this is the low-activity areas. The low-activity area is subtracted from the high activity area to return the area with movement.

Process (1.2) starts with the inputs current frame and expected background. The absolute difference of the current frame and the expected background is found and then R, G, B planes with saturation are added. The absolute difference is then merged with Background (MADB) and the binary threshold of that is found.

Process (1.3) works specifically by starting with an activity mask as the input. The activity mask is sent through an opening process and then the mask is expanded. The MAM is introduced to the output of that process and the mask areas where background does not change are sent to be copied and combined with the expected background. After the MAM is introduced the process will also invert the mask and take the areas where the background does change to make a copy of the current frame using these mask areas. It also will take a copy of that mask and combine it with the expected background. The weighed sum of these copies is found and combined with the masked copy of unchanged background.

Process (1.4) contour extraction starts with the input activity mask. An opening is applied on the activity mask and the output is run through the TC89 algorithm to return the activity contours.

With reference to FIG. 4, the second stage infers which areas from the first step actually conform to the waiting line, rejecting any other surrounding activity. The waiting line segmentation finds the activity contours from the previous block and determines which of them actually belong to the waiting line. The algorithm needs a manually-defined area where to look for the line head. The line head is at the point towards which people in the line are waiting to access and is composed by the people that are about to access. If such line head is found, the rest of the line's first segment is found by fitting a curve model. Then, if the line has discontinuities due to the gaps between the people or occluding objects, any other potential line fragments are sought and included in the model. Finally, a longer-term line model is updated with the line found in the current frame, in case that the observation is not too noisy.

There can be situations in which the image of the waiting line has gaps. This can be due to people standing too far from each other or because the line passes behind occluding objects, like trees or light poles. To cope with these situations, contours that lay after the line's first contour end point are sought. If they meet the certain conditions, they are appended to the line's tail, the end point is updated and the search process is repeated until no more potential line contours are found.

Referring to FIG. 4 in more detail, the process of waiting line segmentation starts with the activity contours as input. Then the operation (2.1) find line first contour is completed producing an input that is run through the operation (2.2) find optimal path from start point over contour. The output of this operation is run through operation (2.3) to extend path from end point of first contour over fragmented contours. The output of (2.3) is run through the operation (2.4) update line model which creates two outputs being the curve model of line and the line contours.

The operation (2.1) find line first contour starts with the input activity contours. The activity contours are run through the operation to find contours that touch the user-defined line start box. The output of the operation is then sorted to find the one with the largest area. The output from this is the line first contour.

The operation (2.2) find optimal path from start point over contour uses the input line first contour. The line first contour is processed to extract the contour curvature. The output of this is run through a low-pass filter curvature. After the filter the curvature local maxima is found. The output results then provide the path over the contour between start point and a local maxima that maximizes the benefit score B. The output of this process is the optimal curve model.

The operation (2.3) extend path from end point of first contour over fragmented contours operates by taking the optimal curve model as an input. The end point of the optimal curve model is then found. Then the derivative at local interval around optimal curve end point is found. The next operation is the initialization step for an iterative process, where the current line first contour is stored in S, all other contours are stored in R, and the curve end point is added as the first element of the path set P, this first element is represented by assigning subscript index i to zero. The iterative process will go through all contour elements N in R that are close to the current line first contour S and do not imply a subtle turn, these two decisions are made also based on the input threshold maps. Threshold maps are also an input at this part of the process. The output is then analyzed for two outcomes: if size of N==0 then the extended path (P) has been found; and if size of N==0 is not true then S=N, remove N from R. This process recalculates the average of all elements in N of the element's farthest point from the current optimal curve end point. The derivative is then updated with this estimated average. The current optimal curve end point then equals the point of contour in N whose projection is highest over the derivative. The output of this process then added to the extended path P, then iteration of the calculation of N using threshold maps takes place.

The operation (2.4) update line model starts with the input extended path (P). The path is subsampled to a fixed number of points. Subsamples are used to find the total length of the extended path (P) which is subtracted from its inverse, yielding a delta L which is input to a Gaussian estimator and that is used for normalization.

If normalized delta L is determined to be too high, then the curve model of the line has been found. If normalized delta L is not determined to be too high, the line model is updated with P before outputting the curve model of the line.

Figure 5:
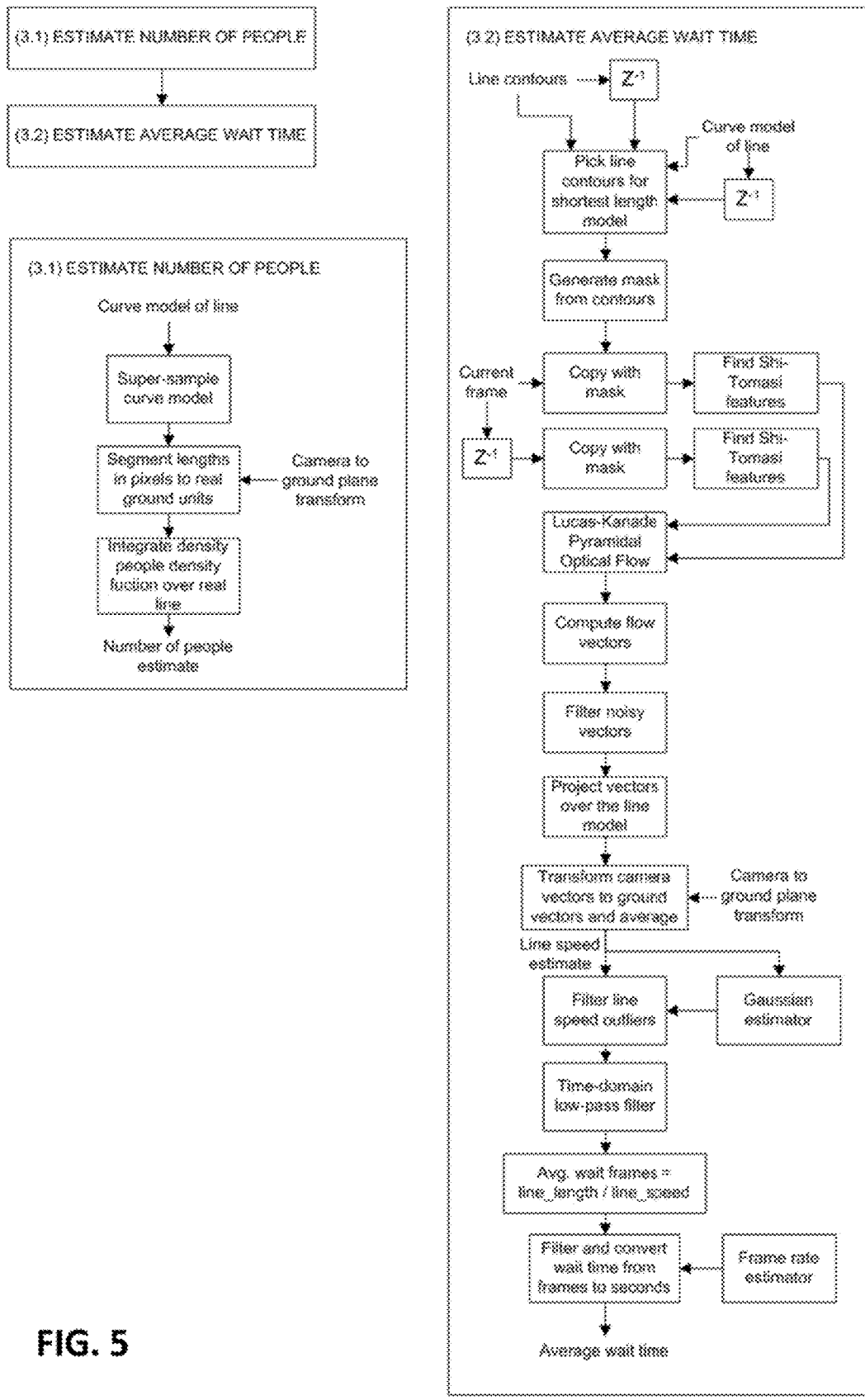
FIG. 5 is a flow diagram showing more detail of deriving measurements of attributes from video data according to an embodiment.
Figure 6:
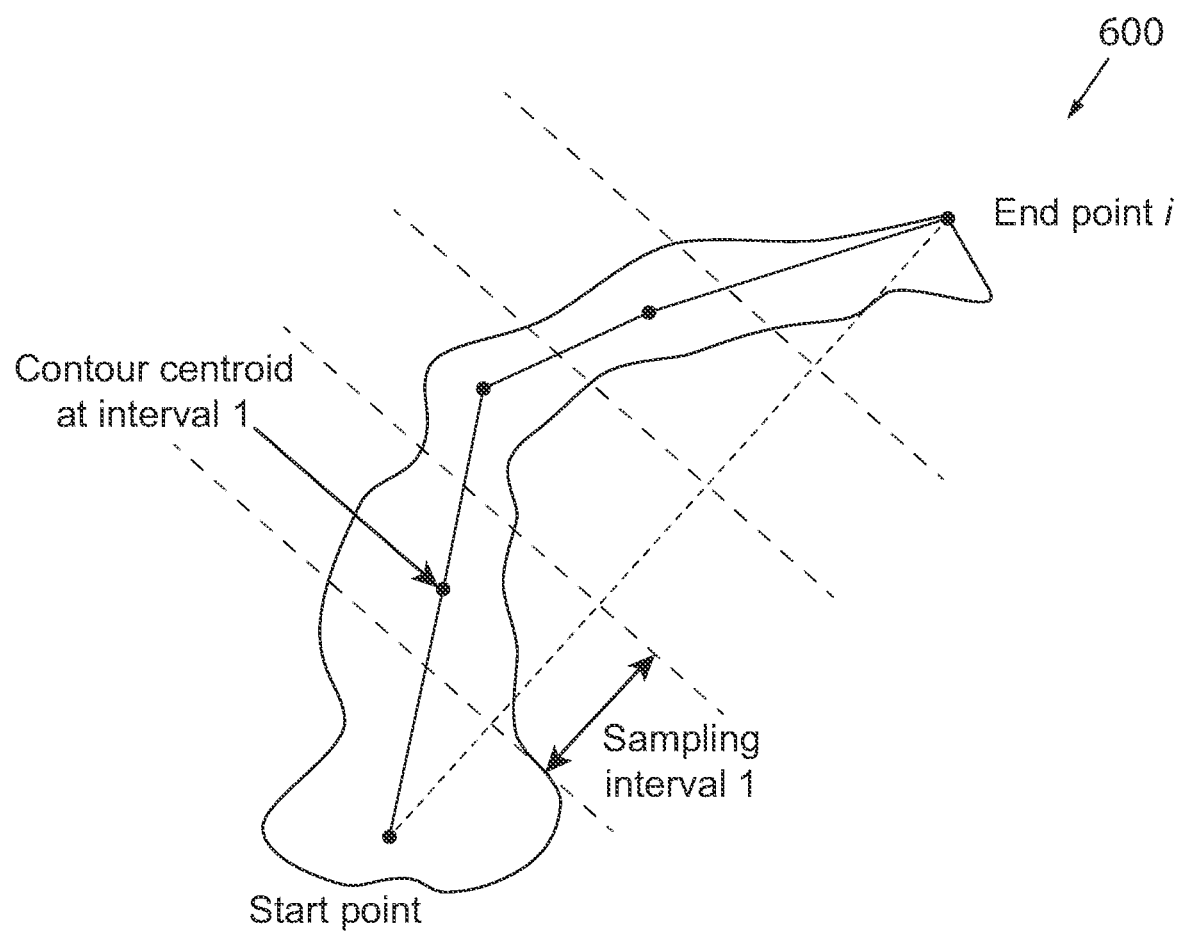
FIG. 6 is a diagram illustration of segmentation of a waiting line from video data according to an embodiment.

With reference to FIG. 5 and FIG. 6, the third step estimates the line attributes of interest. There are currently two attributes that can be measured for a waiting line: the number of people in the line and the average wait time. The number of people is estimated from the line length with a heuristic people density function. The wait time is inferred from the line length and an estimation of the average line speed.

The estimation of the number of people that wait in the line is the line integral along the line model of a people density function. Since the density function variable is a distance over the ground plane, a transformation from image pixels to ground plane distance units must be applied first. The transformation is pre-computed for the specific camera intrinsic and extrinsic parameters. The density function is numerically integrated and, therefore, a first super-sampling step is required to ensure proper accuracy of the result.

In low quality video footage, it is sometimes impossible to distinguish individual people, so tracking waiting persons to know the time that it takes to travel the whole line is usually not viable. Instead, this approach to estimating the average wait time consists in dividing the line length by the average line speed. The line speed is estimated by computing the optical flow of a set of salient points into the line contours over each pair of consecutive frames.

The salient points are found by running the Shi-Tomasi corner detector [1] over the line contour areas. The optical flow is computed with a pyramidal version of the Lucas-Kanade algorithm [2]. Noisy flow vectors—those with impossible speeds for a person walking in a line—are removed from the resulting set. When dividing the line length by the average speed, the resulting wait time is a number of frames. This figure depends on the camera frame rate. The conversion to seconds is achieved by dividing the result by the camera frame rate. Since the system has to deal with variable frame rate video streams, there is a frame rate estimator block that provides this measure.

Referring to FIG. 5 in more detail, some of the many attributes that can be estimated include 3.1 an estimate of the number of people, and 3.2 an estimate of average wait time. To estimate the number of people, the curve model of line is super-sampled and the output lengths are segmented in pixels to real ground units using a camera-to-ground-plane transform. The density of people function is integrated over the real line, yielding the estimate of the number of people.

Referring to 3.2, the average wait time is estimated by transforming the line contours and picking contours for shortest length model, also using a transform of the curve model of the line. Mask contours are generated from the contours. Then a copy with the mask (using the current frame) is used to find Shi-Tomasi features in this masked frame. Also, a an inversed transformed copy with the mask (using the transformed current frame) is used to find Shi-Tomasi features the Shi-Tomasi features in the second copy. Shi-Tomasi features from both copies are inputs to the Lucas-Kanade Pyramidal optical flow the input is provided to compute flow vectors. Then noisy flow vectors are filtered out and resulting vectors are projected over the line model.

Using a camera-to-ground-plane transformation, then the camera vectors are transformed to ground vectors and averaged, yielding a line speed estimate which is filtered for line speed outliers both with and without being run through a Gaussian estimator. The filtered line speed is run through the time-domain low-pass filter to obtain average wait frames (line_length divided by line_speed). The average wait frames are then filtered and converted from frames to seconds using a wait frame estimator, to yield an average wait.

Figure 7:
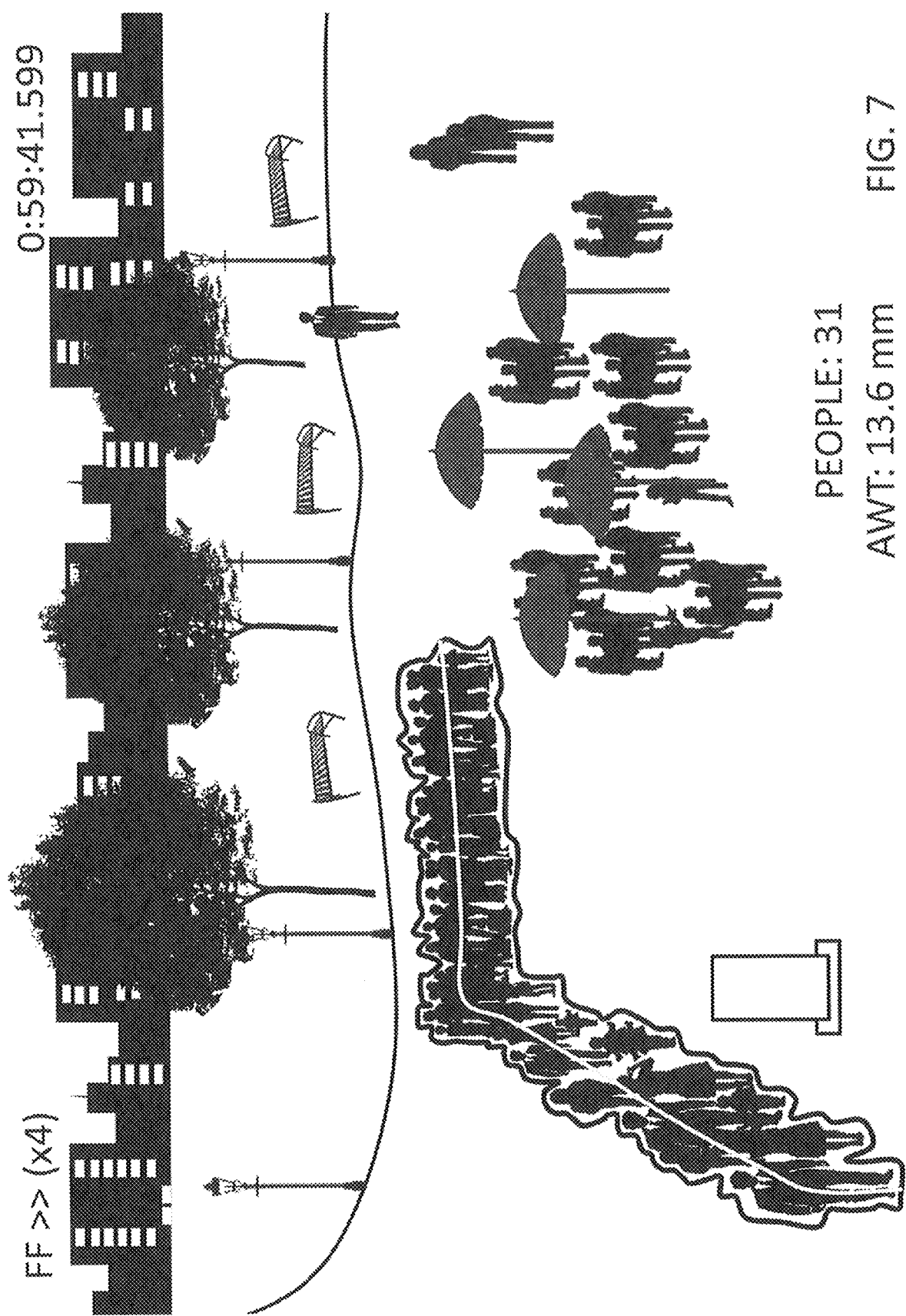
FIG. 7 is shows a user interface display with a waiting line as captured by a video camera with currently calculated attributes imposed on the image.

FIG. 7 is shows a user interface display with a waiting line as captured by a video camera with currently calculated attributes imposed on the image.

Additional Data Algorithms

Automated Detection of Building Entrances Using Trajectories: Areas where Many Trajectories Start or End are Likely to be Building Entrances.

The recognition and tracking algorithms described above are able to detect, recognize and track the trajectories of pedestrians, vehicles, and other types of urban elements. Based on the output of this algorithm, we are able to detect starting points and ending points of people or vehicles. We can detect areas of the video streams where more people or vehicles start or end their trajectories over long periods of time—typically 24 hours are required. These areas, when not on the border of the video streams, are areas where these elements appear or disappear.

Some of these areas will be areas of occlusion—a tree canopy, a large object hiding the view, etc. In such cases there are clear borders to the start and end points of trajectories and no trajectory will start or end, at all, where the occlusion is.

In cases where trajectories appear or disappear in a more scattered and distributed way, we probably are seeing a building entrance.

In order to automatically detect building entrances or exits, we represent all starting or ending points of trajectories on a map of the video stream. Then we run a local window analysis of the geographic distribution of these points. We can either use moments or simply cross point distance, or even principal components analysis. Moments and distances have proven to be great indicators of building entrances. This is extremely valuable to detect building automatically but also to start counting people coming in and out. Every trajectory starting in that entrance area will count as one person exiting the building. Every trajectory ending there will count as a person entering the building. By counting these entrances and exits continuously, statistically correcting numbers for detection errors, we can get to a real time count of occupancy and traffic in a given location. This is valid for people, cars, any type of vehicles.

Automated Segmentation of Urban Scenes: By Analyzing where, on Average, People or Vehicles or Bicycles are Located in an Image we can Automatically Detect where Sidewalks, Roads, Bike Routes and Road Crossings are.

Using the same algorithms as the ones described above, we have trajectory information about different types of elements of urban scenes. For this data analysis, the focus is on pedestrian, vehicles, public transportation vehicles, bicycles. By adding up all trajectories in a map of the video feed (pixels corresponding to the video feed pixels) we can have a map of where each type of elements moves and is in the image. If it is pedestrians, these areas will be mostly sidewalks, crossroads, parks, plazas. If it is vehicles, it will be roads. For bicycles it will be bicycle lanes. If both vehicles and pedestrians are detected at non overlapping times, this will be crosswalks. This map will be quite accurate even if the detection and classification of objects is not very accurate. Embodiments typically work with detectors that have a <10% false positives rate and >50% detection rate.

Using this approach a map of the image is automatically built up, thus improving classification results. A post process detection scores can be posted based on this map—a pedestrian detection score in a sidewalk area will be increased, decreased in non-classified areas (buildings, sky, etc.). Or the algorithm parameters can be adjusted based on image location—a prior optimization approach as opposed to the posterior approach described right before.

"Virtual Turnstile" Approach: Counting how Many People Cross a Line Drawn on a Video.

In this data analysis, groups are considered. The algorithm self-calibrates in a first step, assessing the average dimension of a person. To do this it registers all the sizes of moving objects crossing the threshold. It assumes they are mostly people. It also assumes that at least a given percentage N of them are not merged into groups. If we order all sizes, the N*tot_elements/100 element represents the typical person's size. This is used to infer how many people are in a blob that crosses the line. We assume that there is always a certain overlap between people and factor that into the regression function to go from number of pixels in the blob to # persons in the blob. Alternatively, a ground truth approach is used to adjust parameters and have a linear per part regression function: we design a liner-per-part model (a set of connected segments) as the function f(x)=n where x is the # pixels and n the estimated number of people. A linear regression is used to start, and then the set into two subsets where the samples are divided by two, and iterate until reaching the desired number of segments—typically 8.

Figure 8:
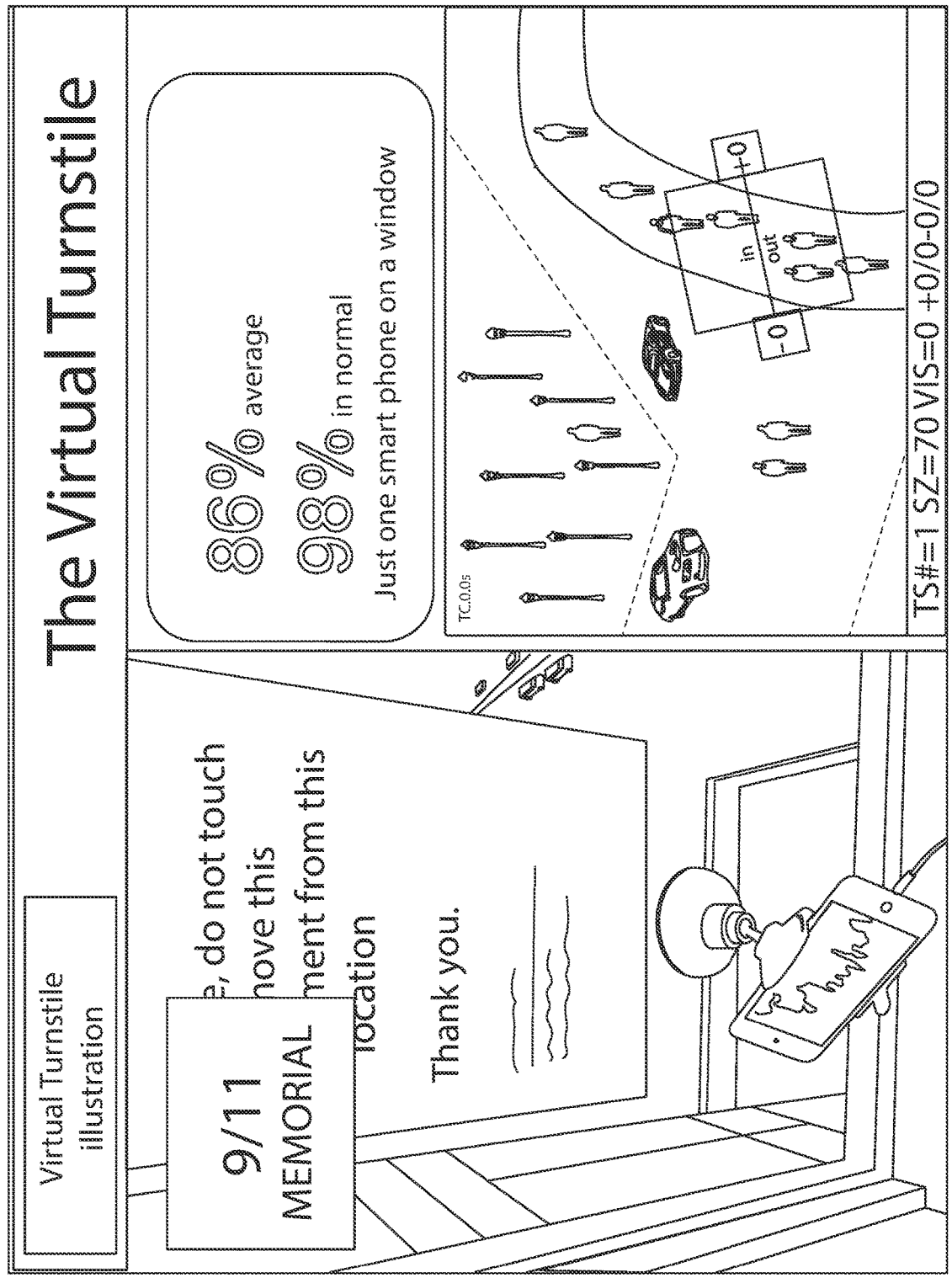
FIG. 8 is a diagram illustrating a virtual turnstile according to an embodiment.

This methodology was tested on views of the 9-11 Memorial Park in NYC captured by one smart phone camera, as shown in FIG. 8. Accuracies up to 98% were under normal conditions. Under average conditions accuracy reaches 86%.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A non-transient computer-readable medium having instructions stored thereon, that when executed by a processor cause a video processing method to be performed, a method comprising:
   executing a plurality of video analysis worker processes on a processor, the plurality of video analysis worker processes operate on a plurality of video data streams to generate processed video data that includes real time information related to scenes, wherein the multiple video streams originate from a plurality of devices of different types, wherein the video analysis worker processes,
   gather and store processed data from the plurality of video streams;
   architecturally remove any dependency of the processes on the different types of video data streams;
   merge the video data from the plurality of devices;
   detect moving objects based on estimating a background image of a fixed video stream;
   classify the moving objects as one of "known object" and "noise"; and
   track a trajectory of one of the moving objects over time.

2. The non-transient computer-readable medium of claim 1, wherein the processor further executes the video analysis worker processes to operate on only moving object video data to detect human readable data comprising vehicle speed, pedestrian speed, humans entering a location, and humans exiting a location.

3. The non-transient computer-readable medium of claim 1, wherein the processor further executes the video analysis worker processes to:
   package and serve processed data as an output.

4. The non-transient computer-readable medium of claim 1, wherein the method further comprises executing a video sensor application on a mobile device which is one of the plurality of devices, wherein the video sensor application performs various functions using the mobile device, the functions comprising,
   encoding consecutive video files;
   time stamping the consecutive video files; and
   pushing the consecutive video files to a file server to produce a stable stream of video data.

5. The non-transient computer-readable medium of claim 1, wherein the processor further executes the video analysis worker processes to make the processed data available to one or more user interfaces that display graphical information and text information regarding a scene in real time.

6. A non-transient computer-readable medium having instructions stored thereon, that when executed by a processor cause a video processing method to be performed, a method comprising:
  executing a video sensor application on a mobile device, the mobile device is selected from a plurality of devices of different types, wherein the video sensor application performs various functions using the mobile device, the functions comprising,
    encoding consecutive video files;
    time stamping the consecutive video files; and
    pushing the consecutive video files to a file server to produce a stable stream of video data; and
  executing a plurality of video analysis worker processes on a processor, the plurality of video analysis work processes operate on a plurality of video data streams to generate processed video data that includes real time information related to scenes, wherein the multiple video streams originate from the plurality of devices of different types, wherein the video analysis worker processes,
  detect moving objects based on estimating a background image of a fixed video stream;
  classify the moving objects as one of "known object" and "noise"; and
  track a trajectory of one of the moving objects over time.

7. The non-transient computer-readable medium of claim 6, wherein the processor further executes the video analysis worker processes to operate on only moving object video data to detect human readable data comprising vehicle speed, pedestrian speed, humans entering a location, and humans exiting a location.

8. The non-transient computer-readable medium of claim 6, wherein the processor further executes the video analysis worker processes to:
  gather and store processed data from the plurality of video streams;
  architecturally remove any dependency of the processes on the different types of video data streams;
  merge the video data from the plurality of devices; and
  package and serve processed data as an output.

9. The non-transient computer-readable medium of claim 6, wherein the processor further executes the video analysis worker processes to make the processed data available to one or more user interfaces that display graphical information and text information regarding a scene in real time.

* * * * *